(12) United States Patent
Goodwin et al.

(10) Patent No.: US 6,490,389 B1
(45) Date of Patent: Dec. 3, 2002

(54) FIBRE FUSE PROTECTION

(75) Inventors: Richard Goodwin, Gt Dunmow (GB); Terry Clapp, Standon (GB); Alan Robinson, Harlow (GB); Vincent Handerek, Grays (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/544,362

(22) Filed: Apr. 6, 2000

(51) Int. Cl.[7] .................................................. G02B 6/26
(52) U.S. Cl. ........................................................ 385/27
(58) Field of Search ............................... 385/27, 27.99; 356/73.1; 606/11; 340/590

(56) References Cited

U.S. PATENT DOCUMENTS

| 4,896,141 | A | * | 1/1990 | Farquhar et al. | ........ | 250/227.14 |
| 5,104,391 | A | * | 4/1992 | Ingle et al. | ............ | 250/227.15 |
| 5,146,521 | A | * | 9/1992 | Hartog | ........................ | 385/48 |
| 5,566,018 | A | * | 10/1996 | Lee et al. | ................... | 359/114 |
| 5,784,514 | A | * | 7/1998 | Yanagi et al. | ................. | 385/88 |
| 5,965,876 | A | * | 10/1999 | Anemogiannis et al. ............................................................ | | 250/227.15 |
| 5,985,086 | A | | 11/1999 | Peall | .......................... | 156/292 |
| 6,035,084 | A | * | 3/2000 | Haake et al. | ................. | 385/49 |
| 6,259,517 | B1 | * | 7/2001 | Tedesco et al. | ........ | 250/227.14 |

OTHER PUBLICATIONS

Electronics Letters Jan. 7, 1988, vol. 24 No. 1 pp. 47–48 by R Kashyap & K J Blow.
Electronics Letters Jan. 5, 1989, vol. 25 No. 1 pp. 33–34 by D P Hand & T A Birks.
G.664 "Optical Safety Procedures and Requirements for Optical Transport Systems" Jun. 1999.
Chambers Science and Technology Dictionary, 1988, p126.

* cited by examiner

Primary Examiner—Ellen E. Kim
(74) Attorney, Agent, or Firm—Lee, Mann, Smith, McWilliams, Sweeney & Ohlson

(57) ABSTRACT

The fibre fuse effect, also termed self propelled self focusing (SPSF) is a catastrophic damage mechanism resulting from a runaway thermal affect which can melt optical fibres. A method and apparatus for limiting the damage caused by a fibre fuse is provided by utilising a detector external to the fibre for monitoring the condition of the fibre.

21 Claims, 3 Drawing Sheets

FIBRE FUSE PROTECTION

FIELD OF THE INVENTION

The present invention relates to the phenomenon known as a fibre fuse, and in particular a method and apparatus for limiting the damage caused by a fibre fuse.

BACKGROUND OF THE INVENTION

Optical power levels in optical transmission systems are generally increasing. This is due to a number of factors.

For instance, optical transmission systems, including optical fibres and other optical devices such as polarisation mode dispersion compensation mechanisms and photonic switches, all have attenuation characteristics. Increasing the power of an optical signal provides a better signal to background noise ratio, and allows the signal to be transmitted longer distances over the optical transmission system before optical amplification is required. Advances in laser technology have ensured that higher powered layers are now more readily and cheaply available, thus allowing a cost effective implementation of high optical power signal generation.

Typical optical transmission systems simultaneously transmit data using a multitude of different wavelengths, each transmission channel having a separate wavelength of light for transmission of the respective optical signal. Increasingly, channels are becoming more closely packed together with regard to wavelength e.g. DWDM (Dense Wavelength Division Multiplexed) systems. Increasing the number of simultaneous optical transmissions at different wavelengths will pro rata increase the average optical power being carried by the transmission system.

Many optical systems utilise optical amplifiers comprising optical fibre. An example of this is a Raman amplifier i.e. an amplifier that utilises the Raman effect. Optical amplifiers of this type normally use relatively high power pump lasers for providing the optical power that is utilised to amplify the optical signal power. Current trends indicate it is increasingly likely that Raman amplifiers will be utilised in future telecommunications systems.

Experiments have indicated that high power optical signals propagating through fibres can induce an effect referred to as a "fibre fuse". The fibre fuse effect, also termed self—propelled self—focusing (SPSF), is a catastrophic damage mechanism. *Electronics letters*, Jan. 7, 1988, Vol. 24, No. 1, pages 47–48 by R Kashyap & K J Blow and *Electronics letters* Jan. 5, 1989, Vol. 25, No. 1, Pages 33–34 by D P Hand & T A Birks describe this phenomena in some detail and describe a fibre fuse damage circuit—breaker, and are incorporated herein by reference.

The fibre fuse effect is believed to be initiated by local heating of the fibre. This can lead to a runway thermal effect which, provided the laser power is sufficient, continues until the fibre core melts. A thermal shock wave is created (visible as a bright spot of side—scattered light) that propagates back along the fibre towards the optical power source. This results in the fibre being permanently damaged and unable to guide light.

Propagation velocity is believed to be of the order of tens of meters per second. A fibre fuse occurring in a telecommunications system could be extremely damaging. The side—scattered light could be dangerous to any onlookers. Additionally, in systems where optical fibre spans (i.e. typically the length between optical fibre amplifiers) are of the order of 80 kilometers, it will be appreciated that if the fibre fuse is not contained, it has the capacity to damage large lengths of optical fibre. This would require replacement of the damaged fibre. Further, fibre fuses could damage additional components attached to the optical fibre e.g. amplifiers, pump lasers.

It is therefore desirable to limit the damage caused by fire fuses.

The ITU (International Telecommunications Union) document G.664, "optical safety procedures and requirements for optical transport systems" provides guidelines and requirements to provide optically safe working conditions. In particular, it describes an automatic laser shutdown procedure in the event of a cable (optical fibre) break, and requires that the optical power be reduced to a Hazard Level 3A within 3 seconds of the break. Such a time period will clearly allow several tens of meters of optical fibre and related ancillary components to suffer damage.

It is an object of the invention to provide an improved apparatus and method for limiting the damage caused by a fibre fuse.

STATEMENT OF THE INVENTION

In a first aspect, the present invention provides method of protecting an optical system from a fibre fuse comprising the steps of; detecting a predetermined signal external to the fibre core, said signal being indicative of the fibre condition; providing a control signal indicative of said detected fibre condition. Fibre fuses are known to damage the optical fibre. By detecting eh condition of the fibre it is hence possible to detect if an event such as a fibre fuse has occurred. If a fibre condition indicative of a potential fibre fuse having occurred is detected, then a control signal may be provided to the system in order that further action can be taken to limit the damage. Such a control signal could be a continuous signal indicative that the fibre condition has not changed until a fibre fuse occurs, or alternatively a signal that only occurs once a condition indicative of a fibre fuse has occurred.

Preferably, the predetermined signal comprises a temperature measurement. Increases in temperature are associated with fibre fuses, and this temperature increase could be detected directly e.g. by a thermocouple or other heat measurement device.

The predetermined signal can be radiation emitted due to the fibre fuse process. It has been observed that a fibre fuse propagating along an optical fibre can be seen as a very bright white spot travelling along the fibre. This bright spot is thought to be caused by heating of the fibre e.g. a thermal glow. Measurement of this light can thus provide an indication of a fibre fuse.

Alternatively, the predetermined signal is at least a fraction of the signal transmitted along the fibre under normal operating conditions. In normal operation, an optical signal typically propagates longitudinally along the fibre. This signal can comprise any one or more of pump light, data signal(s) or other wavelengths. A fibre fuse will scatter this light, which can then be detected.

Preferably, the method further comprising the step of transmitting said predetermined signal so as to be incident upon the fibre.

Preferably, the predetermined signal is detected after at least one of a selection from the group of reflection from, refraction through, and transmission through the fibre. Reflection from, refraction through or transmission through the fibre can each be utilised to provide a signal indicative of the fibre condition.

Preferably, the incident signal is modulated.

Preferably, the incident signal comprises electro magnetic radiation. Alternatively, other types of signal could be utilised e.g. a beam of electrons or ions.

Preferably, the electro magnetic radiation is light.

Preferably, said predetermined signal is detected external to the fibre. For example, the signal can be detected radiating from the outer cladding of an optical fibre.

Preferably, the method further comprising the step of limiting the optical power output of a component to a level sufficient to quench a fibre fuse if said control signal in indicative of a fibre fuse.

Preferably, the method is performed in less than 3 seconds.

In a further aspect, the present invention provides a method of protecting an optical system from a fibre fuse comprising the steps of providing a length of fibre incorporating a beam expander arranged to quench a fibre fuse.

Preferably, the beam expander is a selection from a group of GRIN (Graded Refractive Index) lens, a ball lens, a bioconical taper, a selfloc lens and a thermally expanded fibre core.

In another aspect, the present invention provides an apparatus for protecting an optical system from a fibre fuse comprising a detector suitable for location external to an optical fibre core and arranged for detecting a predetermined signal indicative of the fibre condition.

Preferably, said signal is radiation emitted due to the fibre fuse process.

Alternatively, the signal is at least a portion of the signal normally transmitted along the fibre.

Preferably, the apparatus further comprising a transmitter arranged to transmit said predetermined signal so as to be incident upon the fibre.

Preferably, said detector is located external to the fibre.

Preferably, the apparatus further comprising a control means arranged to provide a control signal indicative of the detected fibre condition.

In a further aspect, the present invention provides a telecommunications system comprising an optical fibre and an apparatus for protecting the system from a fibre fuse comprising a detector located external to the optical fibre, said detector being arranged for detecting a predetermined signal indicative of the fibre condition.

Preferably, the said optical fibre includes a beam expander arranged to quench a fibre fuse.

BRIEF DESCRIPTION OF DRAWINGS

In order that a greater understanding of the invention can be obtained, embodiment to the invention will now be described with reference to the accompanying drawings, by way of example only and without intending to be limiting, in which.

DETAILED DESCRIPTION OF PREFERRED EMBODIMENTS

Figure 1:
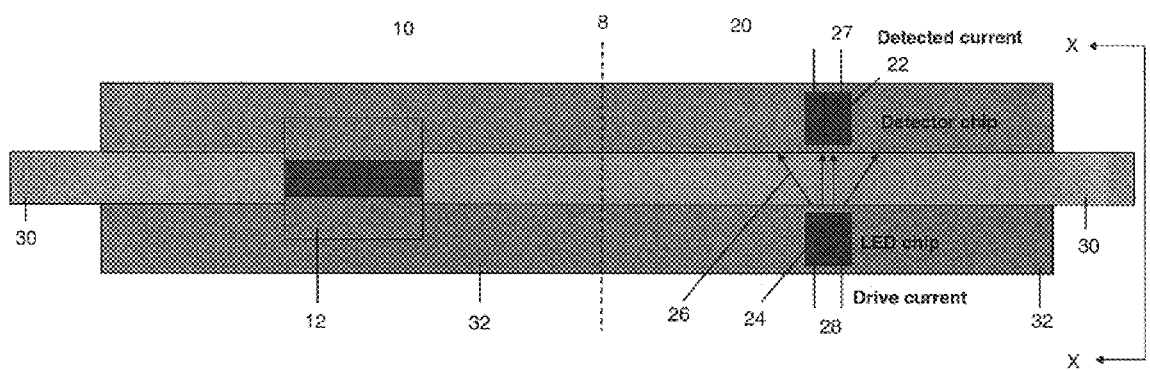
FIG. 1 shows a plan view of a preferred embodiment of the present invention.

FIG. 1 shows an optical fibre 30 locate upon a silicon substrate 32 in a V-groove. V-Groove technology is well known in the art, and allows precise alignment of optical fibres with other components. For instance, granted patent U.S. Pat. No. 5,985,086 describes an example of how an optical fibre may be secured in a V-groove. The apparatus for limiting the damage to the fibre can be seen divided into 2 parts 10,20 by a dotted line 8, the first part 10 acting as a fire wall and the second part 20 acting as a detector of the fibre condition.

The fire wall 10 is formed of a section of optical fibre 12 in which the optical signal beam transmitted along the fibre is expanded laterally in relation to the fibre. By providing a beam expander, the optical power density in the fibre is decreased. This would have the effect of stopping a fibre fuse propagating past the expanded beam section.

As will be appreciated by a skilled person, the expanded beam section could be formed utilising a number of techniques. For instance, a thermally expanded fibre core, a biconical fibre taper, or a section of the fibre using a GRIN (Graded Refractive Index) lens could all be utilised to expand the beam along a predefined length of fibre. Alternatively, the beam expander could be provided by providing a break in the optical fibre, and utilising appropriate lenses (e.g. ball or GRIN lenses) to collimate the beam between the two fibre ends.

The second section 20 comprises a transmitters 24 arranged to transmit an optical signal 26 through the fibre 30. A detector 22 is utilised to detect the signal 26 transmitted through the fibre 30. In operation the signal 28 (in this example, the drive current) controlling the transmitter 24 can be modulated in order to modulate the signal 26. This will have the effect of modulating the output 27 from the detector (in this case the detected current). The detected signal is indicative of the transmission co-efficient of the optical fibre 30, and hence indicative of the fibre condition. AC coupling the detector reduces errors from slow changes in the signal or detector response. Modulation of the source can also be used to reduce and drift effects.

In use, an optical signal will propagate from left to right along the optical fibre 30 shown in FIG. 1, first passing through section 10 and then section 20. If a fibre fuse initiates at a point on the fibre such as that marked by line XX then the fuse will propagate in the directions indicated by the arrows XX i.e. back towards the optical power source. As the optical fibre fuse propagates along the fibre, this has the effect of damaging the fibre and changing the characteristics of the fibre this change in characteristics will result in a change in transmission characteristics of the fibre, and hence the change in the output 27 of the detector 22. This change in output can be utilised by a system to take appropriate remedial action e.g. shut down the source of the optical power signal responsible for the fibre fuse, and hence limit the damage caused by the fibre fuse.

Assuming that the fibre fuse continues to propagate (e.g. due to the optical power source not being limited to a power level sufficient to prevent the propagation of the fibre fuse) then the fibre fuse will propagate to the expanded beam section 12. At this point, the power density of the optical signal will be lowered due to the optical signal cross section being decreased. This will have the effect of extinguishing the fibre fuse, and preventing subsequent damage to optical fibre or related components further along the optical fibre.

Figure 2:
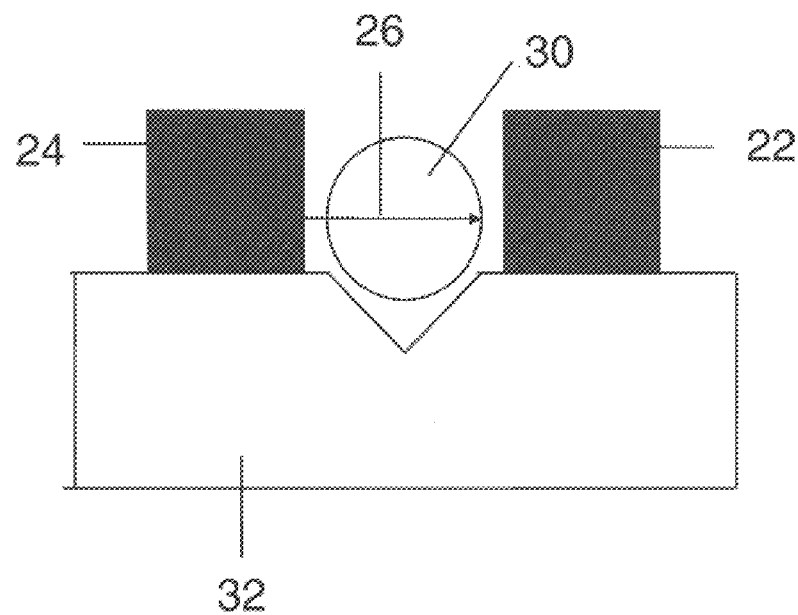
FIG. 2 shows a side view of the preferred embodiment shown in FIG. 1 from the direction indicated by the line XX.
Figure 3:
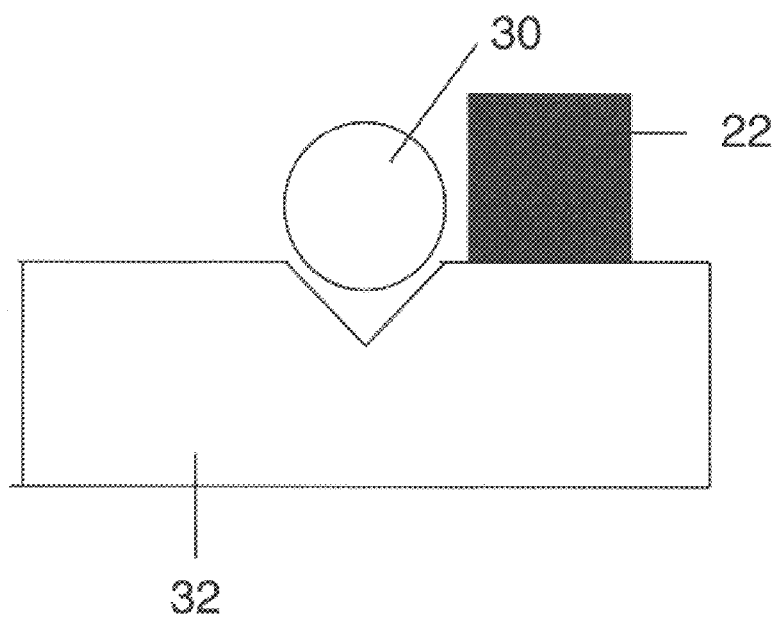
FIG. 3 shows a side view of an alternative embodiment of the present invention.

FIG. 3 shows an alternative embodiment of the present invention, in which the section 20 utilises a photo detector 22, instead of both the transmitter 24 and detector 22 shown in FIG. 2. The photo detector is arranged to detect light transmitted transversely from the fibre. If desired, the photodetector may be wavelength selective i.e. only arranged to detect a discrete range of electromagnetic radiation. If a fibre fuse propagates past the photo detector 22, the photo detector output will increase due to the side scattered light from the fibre fuse. This side scattered light may be from the optical signal that propagates along the fibre in normal operation, and/or from the thermal glow of the fibre fuse. This output can be utilised to take appropriate remedial action to prevent further damage of the system by the fibre fuse.

Whilst the present invention has been disclosed as incorporating two sections 10,20, it will be appreciated that either section may be utilised on its own to limit the damage caused by fibre fuses. Equally, whilst the present invention has been described in relation to telecommunication systems, it will be appreciated that it could be utilised in other optical fibre systems that could be affected by fibre fuses e.g. laser welders and/or medical equipment.

For the purposes of this specification, the terms "optical" and "light" should be understood as pertaining not only to the visible part of the spectrum, but also to the infra red and ultra violet parts that bound the visible part.

Whilst the invention has been described with specific types of components it will be appreciated by a skilled person that a device having similar characteristics could be utilised instead. For instance, whilst the invention has been described with respect to a specific type of optical transmitter (a LED), any other suitable optical transmitter cold be utilised instead.

The foregoing describe the invention including the preferred form thereof. Alterations and modifications as will be obvious to someone skilled in the art are incorporated within the specification hereof.

What is claimed is:

1. A method of protecting an optical system, including a fibre having a fibre core, from a fibre fuse comprising the steps of;

detecting a predetermined signal external to the fibre core, said signal being indicative of a condition of the fibre;

providing a control signal indicative of said detected fibre condition;

determining from the control signal whether said fibre fuse condition exists; and taking remedial action to alleviate said fibre fuse condition if it is determined that the fibre fuse condition exists.

2. A method as claimed in claim 1, wherein the step of taking remedial action comprises:

limiting the optical power output of a component to a level sufficient to alleviate the fibre fuse condition.

3. A method as claimed in claim 2, wherein the method is performed in less than 3 seconds.

4. A method as claimed in claim 1, wherein said predetermined signal comprises a temperature measurement.

5. A method as claimed in claim 1, wherein said predetermined signal is radiation emitted due to the fibre fuse condition.

6. A method as claimed in claim 1, wherein said predetermined signal is at least a fraction of the signal transmitted along the fibre under normal operating conditions.

7. A method as claimed in claim 1, further comprising the step of transmitting said predetermined signal so as to be incident upon the fibre.

8. A method as claimed in claim 7, wherein said predetermined signal is detected after at least one of a selection from the group of reflection from, refraction through, and transmission through the fibre.

9. A method as claimed in claim 7, wherein said incident signal is modulated.

10. A method as claimed in claim 7, wherein said wherein said incident signal comprises electro magnetic radiation.

11. A method as claimed in claim 10, wherein said electro magnetic radiation is light.

12. A method as claimed in claim 1, wherein said predetermined signal is detected external to the fibre.

13. A method as claimed in claim 1, further comprising providing a beam expander between a first and second portion of the fibre, wherein if the fibre fuse condition occurs in the first fibre the beam expander decreases the optical power density of transmitted radiation such that no fibre fuse condition exists in the second fibre.

14. An apparatus for protecting an optical system, including a fibre having a fibre core, from a fibre fuse comprising:

a detector arranged for detecting a predetermined signal external to the fibre core, said signal being indicative of a condition of the fibre and also for providing a control signal indicative of said detected fibre condition; and a controller arranged for determining from the control signal whether said fibre fuse condition exists and for taking remedial action to alleviate said fibre fuse condition if it is determined that the fibre fuse condition exists.

15. Apparatus according to claim 14, wherein the controller limits the optical power output of a component in the system to a level sufficient to alleviate the fibre fuse condition.

16. An apparatus as claimed in claim 14, wherein said signal is radiation emitted due to the fibre fuse processing.

17. An apparatus as claimed in claim 14, wherein said signal is at least a portion of the signal normally transmitted along the fibre.

18. An apparatus as claimed in claim 14, further comprising a transmitter arranged to transmit said predetermined signal so at to be incident upon the fibre.

19. An apparatus as claimed in claim 14, wherein said detector is located external to the fibre.

20. A telecommunications system comprising an optical fibre having a fibre core and an apparatus for protecting a system from a fibre fuse, wherein the apparatus comprises:

a detector arranged for detecting a predetermined signal external to the fibre core, said signal being indicative of a condition of the fibre and also for providing a control signal indicative of said detected fibre condition; and a controller arranged for determining from the control signal whether said fibre fuse condition exists and for taking remedial action to alleviate said fibre fuse condition if it is determined that the fibre fuse condition exists.

21. A system as claimed in claim 20, wherein said optical fibre includes a beam expander arranged to alleviate a fibre fuse.

* * * * *